E. BROSEMANN.
Manufacture of Trimming.
No. 226,484.          Patented April 13, 1880.
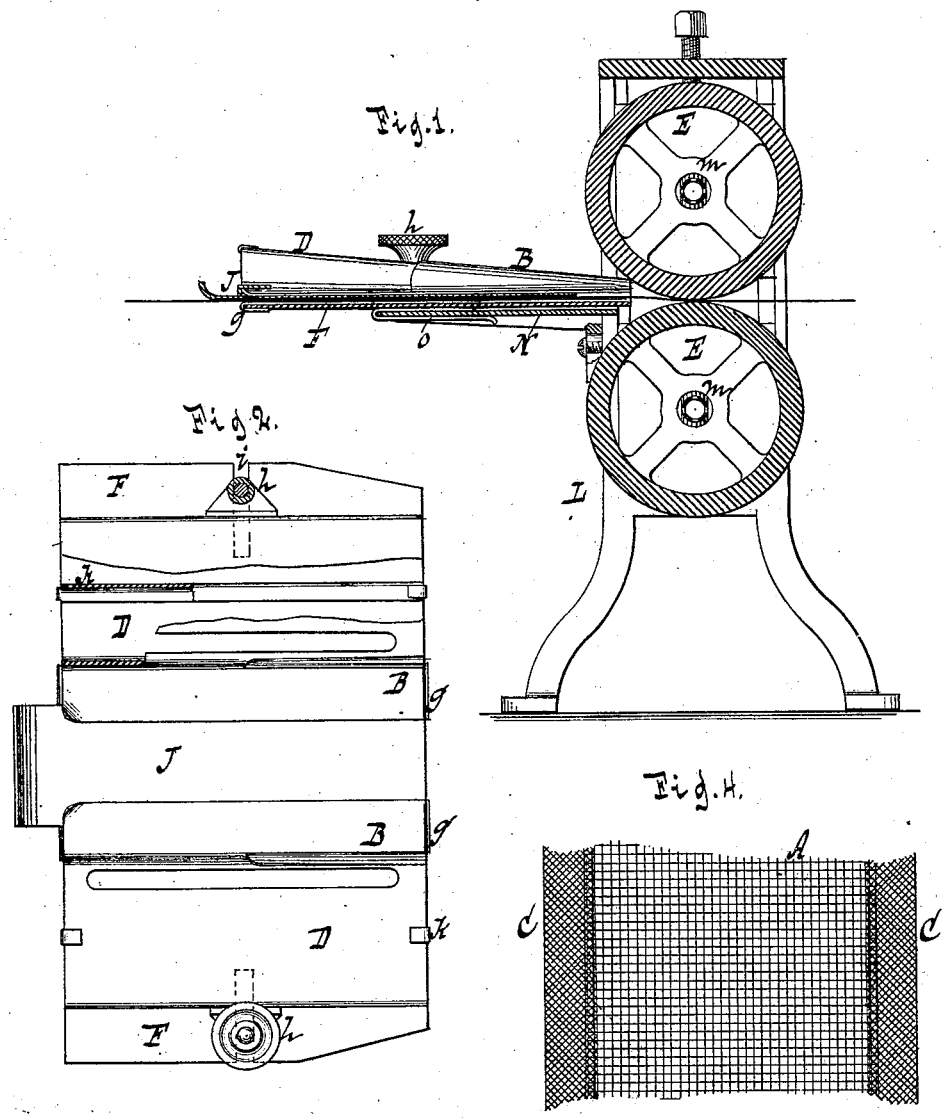

UNITED STATES PATENT OFFICE.

ERNST BROSEMANN, OF NEW YORK, N. Y.

MANUFACTURE OF TRIMMINGS.

SPECIFICATION forming part of Letters Patent No. 226,484, dated April 13, 1880.

Application filed October 17, 1879.

*To all whom it may concern:*

Be it known that I, ERNST BROSEMANN, of the city, county, and State of New York, have invented a new and useful Improvement in the Manufacture of Trimmings, which invention is fully set forth in the following specification, reference being had to the accompanying drawings, in which—

Figure 1 represents a vertical cross-section of a machine used in carrying out my invention. Fig. 2 is a plan or top view, partly in section, of the guides and gages. Fig. 3 shows the guides and gages in end view. Figs. 4 and 5 show a piece of trimming embodying my invention.

Similar letters indicate corresponding parts.

This invention relates to a process of uniting edging with a body or supporting fabric in the manufacture of trimmings for ladies' wear; and it consists in providing the body-fabric with a double or serpentine fold upon its edge or edges, then inserting the edging into such fold and subjecting the latter to heat and pressure, thereby flattening the fold upon itself and the edging.

It also consists in a machine for carrying out the foregoing process, in which are combined one or two folding-guides acting on the edge or edges of the body-fabric, one or two gages for leading the edging into the fold of the body-fabric, and heated pressure-rollers adapted to receive the body with the edging between them.

In carrying out my invention I take a piece or strip, A, of fabric suitable to form the body of the trimming, and adjust the opposite edges thereof in folding-guides B B, which are so shaped that as the body-fabric passes through them its said edges respectively receive a double or serpentine fold. Simultaneous with the introduction of the body-fabric A into the folding-guides B B, I take two pieces of edging, C C, and adjust the same in gages D D, which are so arranged that the edging passing through them is laid or inserted in the folds of the body-fabric at or near the delivery end of the folding-guides. In the said folded condition of the body-fabric A, and with the edging C C laid in its folds, I pass the whole between heated rollers E E, so that the folds are subjected to heat and pressure and are flattened upon themselves and the edging, whereby a firm union of such edging with the body-fabric is obtained. In this manner I obtain a trimming with edging upon both of its sides or edges, as shown in Figs. 4 and 5; but it is obvious that I can also produce a trimming having the edging only on one side or edge.

The respective folding-guides B B and gages D D are fastened together, and are adjustably attached to a bed-plate, F, by means of hooks $g$, catching under the plate, and set-screws $h$, working in slots $i$, so that the folding-guides may be set for body-fabric of different widths.

The folding-guides B B consist of channels suitably bent or twisted to fold the body-fabric in the desired manner, and between such guides is a removable plate, J, to keep the intermediate portion of the body-fabric flat upon the bed-plate F.

The gages D D consist of flat channels, which are open on the side next the folding-guides B B, at the delivery end, as shown in Fig. 3, so that the edging may enter the folding-guides at that point and take its place in the folds of the body-fabric. In the gages D D are arranged transversely-adjustable side pieces, $k$, whereby the width of the gages can be increased or reduced to suit the edging.

The pressure-rollers E E are geared together and have their bearings in a frame, L, while they are heated by internal gas-burners, $m$, connected with a suitable gas-supply pipe.

The frame L carries a ledge, N, which forms a rest for the bed-plate F, and which is so arranged that when the bed-plate is set thereon the delivery ends of the folding-guides B B and the gages D D are brought to a point between and adjacent to the pressure-rollers. On the bottom of the bed-plate F are spring-hooks $o$, which grasp the ledge N when the bed-plate is put in place, and thus prevent the latter from shifting.

If the edging C C has raised figures, the pressure-rollers E E may be made with reduced diameters at their opposite ends, so that the edging remains out of contact with the rollers as it passes between them.

I am aware that trimming has been attached to a fabric by means of adhesive material and an interposed cord, and that the edge of a fabric has been stitched between the parts of a two-ply edging or trimming, and I do not claim either of these modes of attachment.

What I claim as new, and desire to secure by Letters Patent, is—

1. The process of uniting edging with a body-fabric in the manufacture of trimmings, consisting in providing the body-fabric with a double or serpentine fold upon its edge or edges, then inserting the edging into such fold and subjecting the latter to heat and pressure, thereby flattening the fold upon itself and the edging, substantially as described.

2. In a machine for uniting edging with a body-fabric, the combination of a folding-guide formed to produce double or serpentine folds in the edge of the body-fabric, a gage for guiding the edging into said fold, and heated pressure-rollers for receiving the body-fabric and edging from said guide and flattening the folds of the fabric upon said edging, substantially as described.

In testimony whereof I have hereunto set my hand this 9th day of October, A. D. 1879.

ERNST BROSEMANN.

Witnesses:
ROBERT S. MASTERTON,
CHAS. WAHLERS.